UNITED STATES PATENT OFFICE.

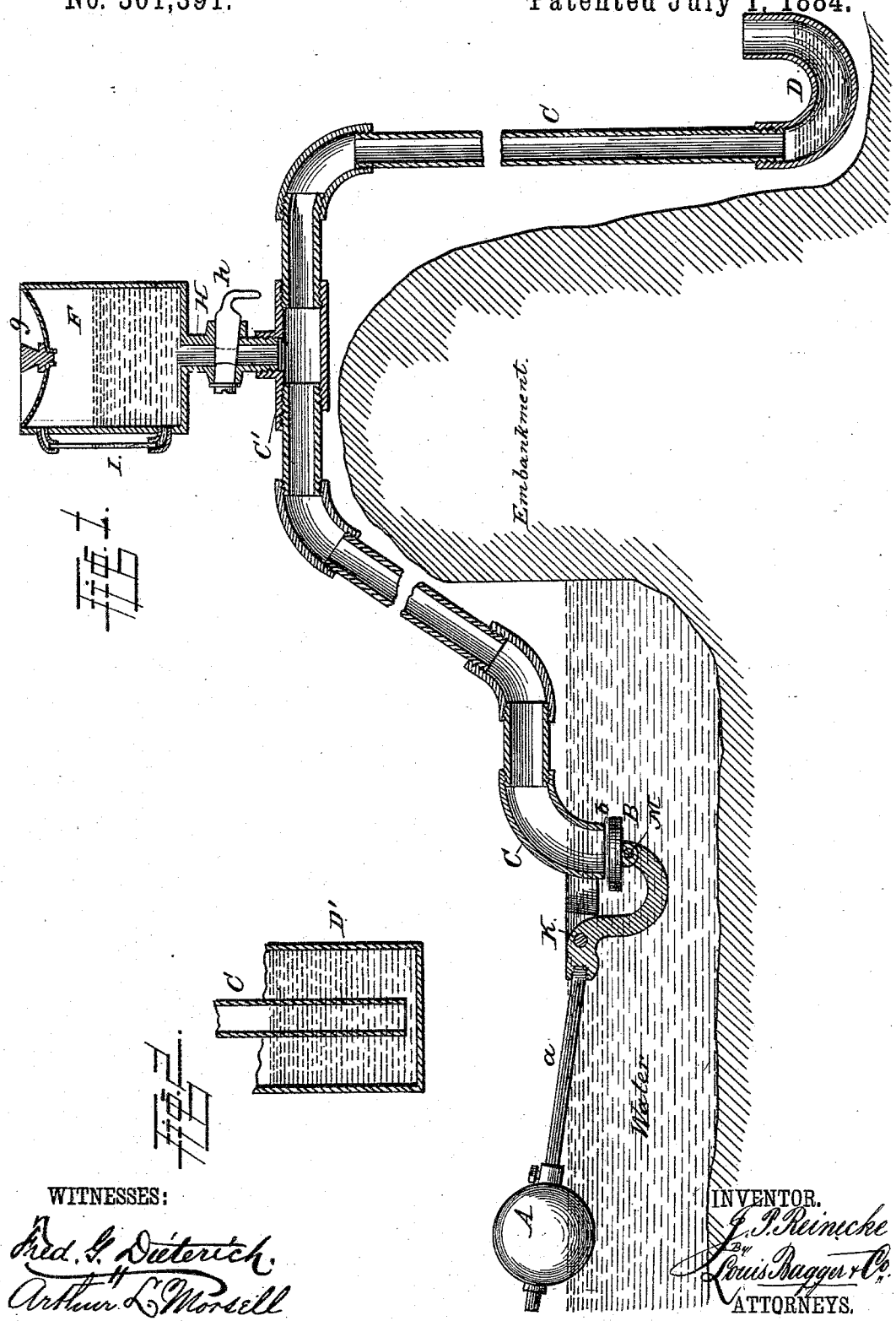

JOHN P. REINECKE, OF PITTSBURG, PENNSYLVANIA.

SIPHON.

SPECIFICATION forming part of Letters Patent No. 301,391, dated July 1, 1884.

Application filed February 15, 1884. (No model.)

*To all whom it may concern:*

Be it known that I, JOHN P. REINECKE, a citizen of the United States, and a resident of Pittsburg, in the county of Allegheny and State of Pennsylvania, have invented certain new and useful Improvements in Siphons; and I do hereby declare that the following is a full, clear, and exact description of the invention, which will enable others skilled in the art to which it appertains to make and use the same, reference being had to the accompanying drawings, which form a part of this specification, and in which—

Figure 1 is a sectional view of my improved automatic siphon, and Fig. 2 is a detail view illustrating a modified construction of one of the parts of the same.

Similar letters of reference indicate corresponding parts in both the figures.

My invention has relation to siphons for transferring liquids from a higher to a lower level; and it consists in the construction and combination of parts of the apparatus, hereinafter more fully described and claimed, which, while more particularly intended for use in coal and other mines for freeing the same from water, is also applicable to a great many other purposes where a device of that class can be used.

In the accompanying drawings, C is the main pipe, one end of which dips into the water. A is a float fastened at one end of a lever, *a*, which has its fulcrum at K, and the other end or short arm of which carries a valve, B, pivoted at M, so as to find a level seat at *b* at the lower end of pipe C. Thus it will be seen that as float A rises by the accumulation of water the valve B is lowered from its seat, so as to open the inlet to pipe C. On the other hand, when the water-level is lowered, the float will sink with it, and thus close the inlet to the pipe by pressing the hinged valve against its seat *b*.

At the highest point of the siphon-pipe C is a T, C', into which is screwed a short vertical pipe, H, having a stop-cock, *h*. Pipe H opens up into the bottom of an air-tight tank, F, provided with a gage-glass, I, on one side, and having an air-tight screw-plug, *g*, through which the tank may be filled with water.

The outlet of the siphon-pipe may either be constructed, as shown in Fig. 1, with a bent pipe or elbow, D, forming a water-seal, or it may be inserted into a small tank or reservoir, D', as shown in Fig. 2, which answers the same purpose—viz., preventing the atmospheric air from entering the pipe during the period when the siphon is not in operation.

The operation of this apparatus is as follows: The tank or reservoir F is filled with water and hermetically sealed by the stopper *g*. The stop-cock *h* is then opened, which fills pipe C' C with water, driving out the atmospheric air contained therein, and sealing the pipe at its lower end, D. If the water rises so as to raise float A sufficiently to open its valve B, water will enter the pipe and escape at its lower end, being lifted over the wall or embankment, as shown in the drawings. The gage-glass I will indicate the amount of water fed from tank F into the pipe, thus indicating when it is necessary to refill the tank. Pipe H being open, all the air-bubbles which ascend the pipe with the water will pass up into the tank, thus maintaining a perfect water-seal throughout the length of the pipe, and thereby insuring its perfect and continuous operation. This is of importance, because in case of any defect in pipe or joints, and air-bubbles contained in water, a little air is apt to enter the pipe, and unless means are provided for disposing of this air, which rises up through the pipe in the form of bubbles, a sufficient quantity of air might enter to break the column of water in the pipe, and thus destroy the operation of the siphon.

Having thus described my invention, I claim and desire to secure by Letters Patent of the United States—

1. The combination, with a siphon, of an air-tight reservoir or water-tank located at its highest point, and connected to it at such point by a pipe provided with a stop-cock, said tank being provided with a gage-glass and an air-tight plug or stopper, substantially as set forth.

2. The automatic siphon herein shown and described, provided at its highest point with an air-tight reservoir or water-tank connected to it by a pipe having a stop-cock, having at the submerged end of its short arm a valve actuated by a float, so as to close the inlet when the water falls below a given level, but open it automatically as it rises above it, and provided at the lower end of its discharge or long arm with a suitable device for maintaining a water-seal when the apparatus is not in operation, substantially as set forth.

In testimony that I claim the foregoing as my own I have hereunto affixed my signature in presence of two witnesses.

JOHN P. REINECKE.

Witnesses:
CHAS. E. WEST,
FRED J. DITTLER, Jr.